(12) United States Patent
Boxberger (10) Patent No.: US 10,819,075 B1
(45) Date of Patent: Oct. 27, 2020

(54) MAGNETIC CONNECTOR FOR TRANSMITTING POWER, SOUND, VIDEO AND OTHER SIGNALS

(71) Applicant: Frank Dale Boxberger, Scottsdale, AZ (US)

(72) Inventor: Frank Dale Boxberger, Scottsdale, AZ (US)

( * ) Notice: Subject to any disclaimer, the term of this patent is extended or adjusted under 35 U.S.C. 154(b) by 0 days.

(21) Appl. No.: 16/517,244

(22) Filed: Jul. 19, 2019

Related U.S. Application Data (60) Provisional application No. 62/700,778, filed on Jul. 19, 2018.

(51) Int. Cl.
| | | |
|---|---|---|
| *H01R 11/30* | (2006.01) | |
| *H01R 33/76* | (2006.01) | |
| *H01R 13/62* | (2006.01) | |
| *H02J 50/70* | (2016.01) | |
| *H01R 107/00* | (2006.01) | |

(52) U.S. Cl.
CPC ......... *H01R 33/7664* (2013.01); *H01R 11/30* (2013.01); *H01R 13/6205* (2013.01); *H02J 50/70* (2016.02); *H01R 2107/00* (2013.01)

(58) Field of Classification Search
CPC ............. H01R 33/7664; H01R 13/6205; H01R 11/30; H01R 2107/00; H02J 50/70
See application file for complete search history.

(56) References Cited

U.S. PATENT DOCUMENTS

| | | | | |
|---|---|---|---|---|
| 4,718,276 | A * | 1/1988 | Laughlin .................. | G01P 3/44 310/11 |
| 5,476,386 | A * | 12/1995 | Booth .................. | H01H 9/0207 439/40 |
| 5,983,464 | A * | 11/1999 | Bauer ................ | A45C 13/1069 24/303 |
| 7,264,479 | B1 * | 9/2007 | Lee ........................ | H01R 11/30 439/39 |
| 7,341,458 | B1 * | 3/2008 | Koh .................... | H01R 13/2421 439/39 |
| 7,901,216 | B2 | 3/2011 | Rohrbach | |
| 9,559,456 | B2 | 1/2017 | Harmon | |
| 2005/0180593 | A1 * | 8/2005 | Kajiwara ................ | H04R 9/06 381/412 |
| 2007/0072443 | A1 * | 3/2007 | Rohrbach ................ | G06F 1/18 439/39 |
| 2011/0189863 | A1 | 8/2011 | Sare, Jr. | |

(Continued)

*Primary Examiner* — Truc T Nguyen
(74) *Attorney, Agent, or Firm* — Plager Schack LLP; Mark H. Plager; Eric Liou (57) ABSTRACT

A magnetic connector that transmits a plurality of signals from an input supply to a device is provided. The magnetic connector includes a first connector body coupled to the input supply and a second connector body coupled to the device, a first set of magnets disposed in the first connector body, and a second set of magnets disposed in the second connector body. The first and second connector bodies connect together with the exposed positive or negative magnetic pole of each magnet in the first set of magnets engaged with the exposed pole of one of the magnets in the second set of magnets having an opposite magnetic pole. Each engaged pair of one magnet in the first set of magnets and one magnet in the second set of magnets transmits one of the plurality of signals from the input supply to the device.

9 Claims, 5 Drawing Sheets

(56) References Cited

U.S. PATENT DOCUMENTS

| | | | |
|---|---|---|---|
| 2012/0178270 A1* | 7/2012 | McElroy | H01R 13/6205 |
| | | | 439/39 |
| 2014/0120746 A1* | 5/2014 | Persion | H01R 11/30 |
| | | | 439/39 |
| 2015/0072556 A1* | 3/2015 | Hirakawa | H01R 24/50 |
| | | | 439/578 |
| 2016/0003270 A1* | 1/2016 | Franklin | H01F 7/0221 |
| | | | 439/529 |
| 2016/0040825 A1* | 2/2016 | Franklin | F16B 1/00 |
| | | | 439/39 |
| 2017/0093087 A1* | 3/2017 | Esmaeili | H01R 13/6205 |
| 2018/0004250 A1* | 1/2018 | Barnett | G06F 1/1656 |

* cited by examiner

MAGNETIC CONNECTOR FOR TRANSMITTING POWER, SOUND, VIDEO AND OTHER SIGNALS

RELATED APPLICATION

The application claims priority to provisional patent application U.S. Ser. No. 62/700,778 filed on Jul. 19, 2018, the entire contents of which is herein incorporated by reference.

BACKGROUND

The embodiments herein relate generally to connectors for electrical devices. More specifically, embodiments of the invention are directed to magnetic connectors for use with electrical devices to transmit electrical power, sound, video and other signals.

Many electrical connectors have polarities, requiring the connector to be plugged in a certain way so that positive and negative polarities are properly connected. Similarly, some connectors have both electrical connections and other connections such as sound, video or loopback connections. In all of these connections, it is important for the connectors to be connected in the proper orientation to make sure the connection operates as intended.

Many connectors for devices use mechanical structures such as shape coded bumps to prevent connectors from being connected backward or the wrong orientation. However, these connectors are limited in that they do not connect and disconnect quickly with minimal user effort. Other connectors use magnetic components to secure the connectors together as disclosed in U.S. Patent Application Publication 2011/0189863, and U.S. Pat. Nos. 9,559,456 and 7,901,216. However, these magnetic connectors do not allow the connectors to easily connect in only one permissible orientation to prevent damage to the connectors' components. Further, these connectors do not effectively shield the magnetic forces generated from the magnetic components to prevent their interference with other components of the connectors.

As such, there is a need in the industry for magnetic connectors that addresses the limitations of the prior art, which can be used to facilitate electrical current, sound, video or loopback connections. There is a further need for the magnetic connectors to have shields that prevent magnetic forces from the magnetic components from interfering with any other components in the connectors.

SUMMARY

In certain embodiments, a magnetic connector for use to transmit a plurality of signals from an input supply to a device is provided. The magnetic connector is configured to shield magnetic fields and signals present therein to minimize interference with one another. The magnetic connector comprises a pair of connector bodies comprising a first connector body coupled to the input supply and a second connector body coupled to the device, each connector body in the first and second connector bodies comprising a plurality of recesses, a first set of magnets disposed in the plurality of recesses in the first connector body, the first set of magnets comprising a plurality of magnets oriented so that a first portion of the plurality of magnets comprises exposed positive magnetic poles and a second portion of the plurality of magnets comprises exposed negative magnetic poles, each magnet in the first set of magnets comprising a shield disposed around the magnet, a second set of magnets disposed in the plurality of recesses in the second connector body, the second set of magnets comprising a plurality of magnets oriented so that a first portion of the plurality of magnets comprises exposed positive magnetic poles and a second portion of the plurality of magnets comprises exposed negative magnetic poles, each magnet in the second set of magnets comprising a shield disposed around the magnet, wherein the first and second connector bodies are configured to connect together with the exposed positive or negative magnetic pole of each magnet in the plurality of magnets in the first set of magnets engaged with the exposed pole of one of the magnets in the plurality of magnets in the second set of magnets having an opposite magnetic pole than the magnet in the first set of magnets, thereby allowing each engaged pair of one magnet in the first set of magnets and one magnet in the second set of magnets to transmit one of the plurality of signals from the input supply to the device.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Different embodiments of the magnetic connector are described herein. These embodiments each have connector surfaces that interact with and are held together by magnets.

Figure 1:
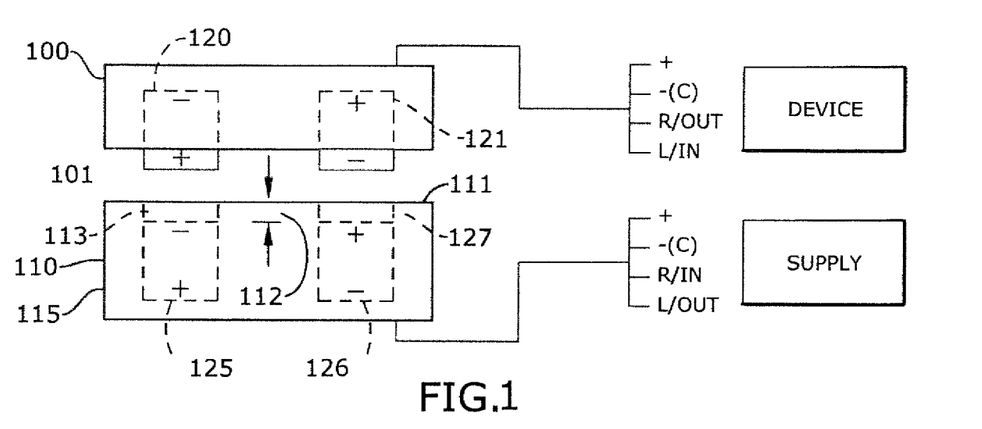
FIG. 1 depicts a schematic side view of certain embodiments of the magnetic connector.

In one embodiment as depicted in FIG. 1, a side view of the magnetic connector is shown, which comprises generally first connector part 100 electrically coupled to a device and a second connector part 110 electrically coupled to an input supply. It shall be appreciated that the connections can be interchanged, e.g., first connector part 100 electrically coupled to the input supply and second connector part 110 electrically coupled to the device. In embodiments of the invention, the magnetic connector such as first and second connector parts 100, 110 are configured to transmit a variety of signals from the input supply to the device including, but not limited to, any combination of a left sound signal, a right sound signal, a video signal, a common line signal, positive power and negative power.

Figure 2:
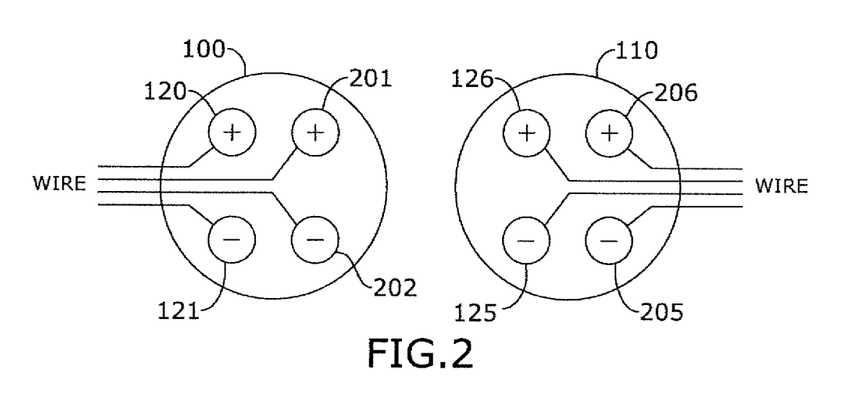
FIG. 2 depicts a schematic inside view of certain embodiments of the magnetic connector.

In one embodiment as depicted in FIGS. 1-2, first connector part 100 and second connector part 110 come into contact with one another and can be separated from one another. Each of the connector parts is a body member preferably made from an insulated plastic or other insulating material case 115 within which is located a plurality of magnets and electrical connectors. In one embodiment, the magnets can be rare earth magnets, such as neodymium magnets. In an alternative embodiment, ceramic magnets can be used.

In one embodiment, first connector part 100 comprises first and second magnets 120, 121 disposed within recesses of first connector part 100. First and second magnets 120, 121 are oriented with opposite magnetic poles exposed outside bottom surface 101 of first connector part 100. In this embodiment, first magnet 120 has an exposed positive pole facing downward and extending a first distance from bottom surface 101 of first connector part 100. Second magnet 121 has an exposed negative pole extending below bottom surface 101 of first connector part 100.

Conversely, second connector part 110 comprises first and second magnets 125, 126 disposed within recesses of second connector part 110. First and second magnets 125, 126 are oriented with opposite magnetic poles exposed within corresponding recesses 113, 127 in second connector part 110. As depicted in FIG. 1, first magnet 125 is recessed below top surface 111 of second connector part 110. There is a small space shown as 112 forming a recess between the magnet and the top of the surface. In this embodiment, first magnet 125 has an exposed negative pole accessible within recess 113 in second connector part 110. Similarly, second magnet 126 has an exposed positive pole accessible within recess 127 in second connector part 110.

In operation, first and second connector parts 100, 110 are oriented so that magnets of the first connector part are aligned with corresponding magnets of the second connector part as depicted in FIG. 1. First and second connector parts 100, 110 are connected together by engaging first magnets 120, 125 in first and second connector parts 100, 110 together and engaging second magnets 121, 126 in first and second connector parts 100, 110 together. In this connection, first magnet 120 extends below bottom surface 101 of first connector part 100 by a length to fit in recess 113 of second connector part 110 so that the opposite exposed poles (+ and −) of first magnets 120, 125 engage with each other. Similarly, second magnet 121 extends below bottom surface 101 of first connector part 100 by a length to fit in recess 127 of second connector part 110 so that the opposite exposed poles (− and +) of second magnets 121, 126 engage with each other.

In this embodiment, second connector part 110 is electrically coupled to the input supply, which can include various input signals including, but not limited to, any combination of positive (+) power, negative (−) power (common line), left sound signal and right sound signal. First connector part 100 is electrically coupled to the device and includes the same connection designations to receive any combination of positive (+) power, negative (−) power (common line), left sound signal and right sound signal from second connector part 110. In an alternative embodiment, the connections can be interchanged, e.g., first connector part 100 electrically coupled to the input supply and second connector part 110 electrically coupled to the device.

FIG. 1 illustrates two pairs of magnets 120, 125, 121, 126 from first and second connector parts 100, 110 that engage with each other. However, it shall be understood that the magnetic connector can include any alternate number of different wires, connections and magnets.

In one embodiment as depicted in FIG. 2, the inside of the magnet connector is illustrated. In this embodiment, first connector part 100 comprises 4 magnets including magnets 120, 121 previously shown, and magnets 201, 202. Magnets 120, 201 with exposed positive magnetic poles are arranged adjacent to each other and magnets 121 and 202 with exposed negative magnetic poles are arranged adjacent to each other. Similarly, second connector part 110 comprises 4 magnets including magnets 125, 126 previously shown, and magnets 205, 206. Magnets 125, 205 with exposed negative magnetic poles are arranged adjacent to each other and magnets 126 and 206 with exposed positive magnetic poles are arranged adjacent to each other.

This allows second connector part 110 as a supply connector to be connected to first connector part 100 as a device connector in one predefined way as permitted by the attraction of opposite magnetic poles present in magnets 125, 126, 205, 206 in second connector part 110 and magnets 120, 121, 201, 202 in first connector part 100. It shall be appreciated that each magnet 120, 121, 125, 126, 201, 202, 205, 206 is coupled to a wire to facilitate the transmission of any signal including, but not limited to, positive (+) power, negative (−) power (common line), left sound signal and right sound signal.

In one embodiment, the magnets in second connection part 110 are all recessed and the magnets in first connection part 100 are all protruding. However, the positioning of magnets in first and second connection parts 100, 110 can vary.

Figure 3:
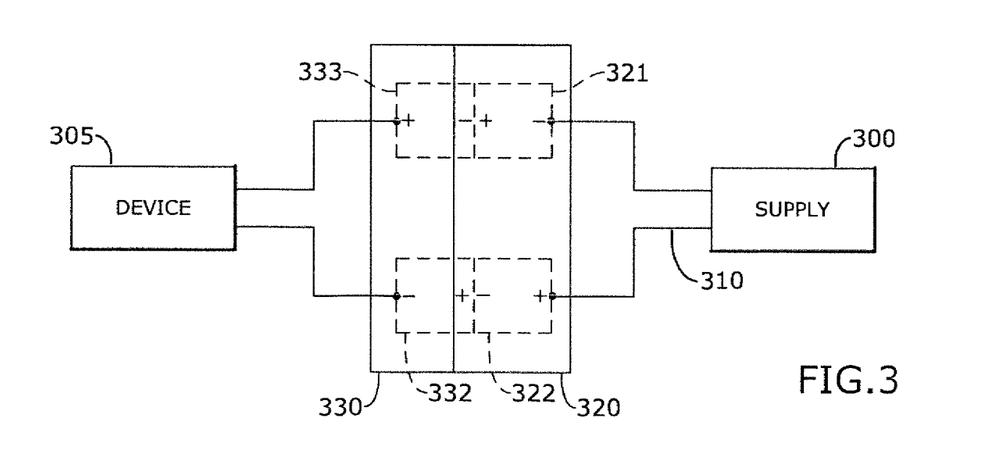
FIG. 3 depicts a schematic view of certain embodiments of the magnetic connector shown in use.

In one embodiment as depicted in FIG. 3, the magnetic connector can be used to transmit a plurality of signals from supply 300 to device 305. The plurality of signals correspond to any of positive (+) power, negative (−) power (common line), left sound signal and right sound signal.

Supply 300 is connected via wires or cables 310 to first connector part 320. In this embodiment, first connector part 320 comprises recessed magnets 321, 322. Second connector part 330 comprises protruding magnets 332, 333 that engage with recessed magnets 321, 322 of first connector part 320. As such, second connector part 330 fits into first connector part 320, so that the positive exposed pole of protruding magnet 332 connects to the negative exposed pole of recessed magnet 322. Correspondingly, the negative exposed pole of protruding magnet 333 connects with the positive exposed pole of recessed magnet 321. When properly connected, the parts attract one another, making an electrical and signal connection which is constrained by the magnetic connection to be in only one possible way.

Figure 4:
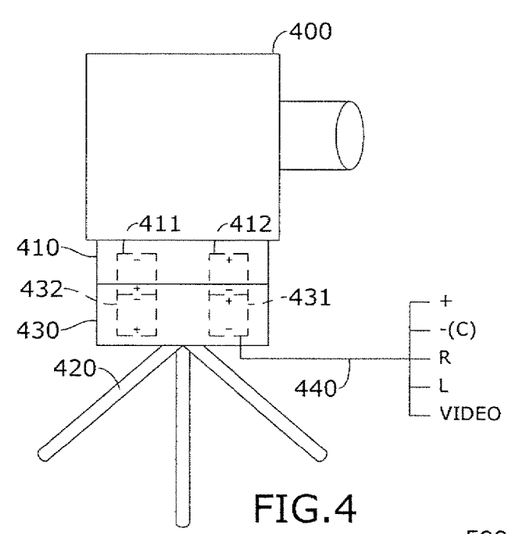
FIG. 4 depicts a schematic view of certain embodiments of the magnetic connector shown in use in a video camera application.

In one embodiment as depicted in FIG. 4, the magnetic connector is used for a video camera hookup. As depicted in FIG. 4, video camera 400 has top connector part 410 thereon, which may comprise components in any of the connectors previously described in embodiments of the invention and illustrated in FIGS. 1-3. In one embodiment, top connector part 410 comprises magnetic connectors 411, 412. A tripod for the video connection is shown as 420 and includes an interface part, which connects to the video camera. The tripod has bottom connector part 430, which comprises magnetic connectors 431, 432.

The magnetic forces between magnetic connectors 411, 412, 431, 432 secure video camera 400 onto tripod 420 and also make the electrical connection. In one embodiment, wire 440 transmits the positive and negative power for the video camera, and may also provide the feed from the video camera including video, and left and right sound.

Figure 5:
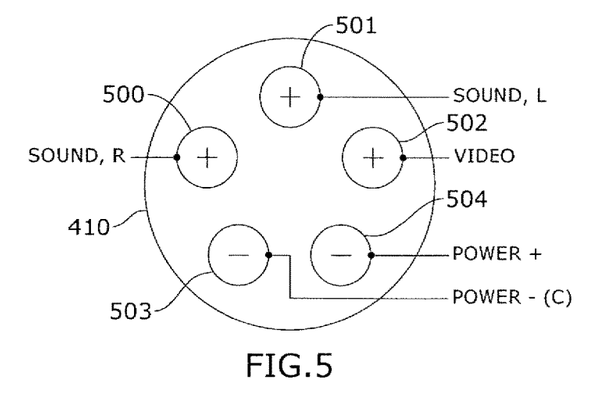
FIG. 5 depicts a schematic view of certain embodiments of the magnetic connector in the video camera application.

In one embodiment as depicted in FIG. 5, top connector part 410 for use in the video camera is shown in more detail. This connector includes five different magnetic connection points 500, 501, 502, 503, 504. The magnetic connection points 500, 501, 502 all display positive magnetic poles of the magnet, while the magnetic connection points 503, 504 all display negative magnetic poles of the magnet. In one embodiment, the sound left and right wires can be connected respectively to magnetic connection points 501, 500, the video wire can be connected to magnetic connection point 502, and positive and negative power wires can be connected respectively to magnetic connection points 504, 503.

In this embodiment, it shall be appreciated that bottom connector part 430 of tripod 420 comprises 5 magnetic connectors that correspond to and engage with magnetic connection points 500, 501, 502, 503, 504 in top connector part 410 to transmit the respective left and right sound signals, video signal, and positive and negative power.

Figure 6:
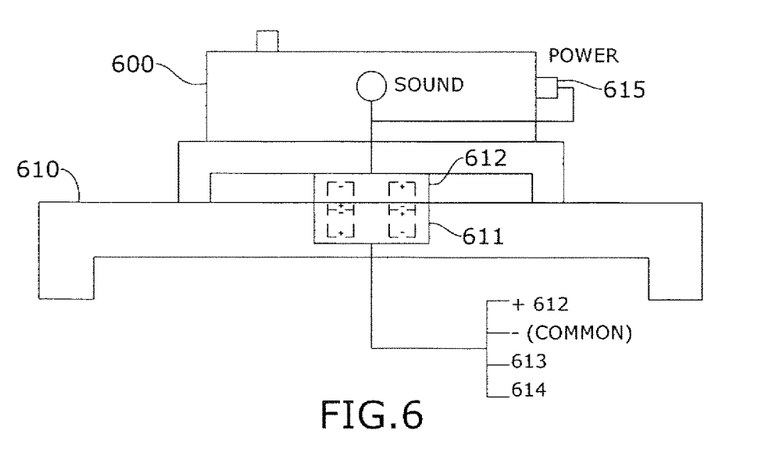
FIG. 6 depicts a schematic view of certain embodiments of the magnetic connector in an effects pedal application.

In an alternative embodiment as depicted in FIG. 6, the magnetic connector is used with guitar effects pedal 600. In this embodiment, guitar effects pedal 600 is connected to pedal board 610. The connection between guitar effects pedal 600 and pedal board 610 is formed by the magnetic connector having any of the components described in any of the previous embodiments. In one embodiment, the magnetic connector comprises effects pedal connector 612 coupled to guitar effects pedal 600 and lower connector part 611 coupled to pedal board 610.

Effects pedal connector 612 and lower connector part 611 connect both mechanically and physically, pedal board 610 to guitar effects pedal 600. In one embodiment, lower connector part 611 receives positive power, negative power (common line), sound in 613 and sound out 614. Effects pedal connector 612 can distribute from lower connector part 611, sound in 613 to guitar effects pedal 600 and distribute the positive and negative power to power plug 615, which is connected to guitar effects pedal 600.

Figure 7:
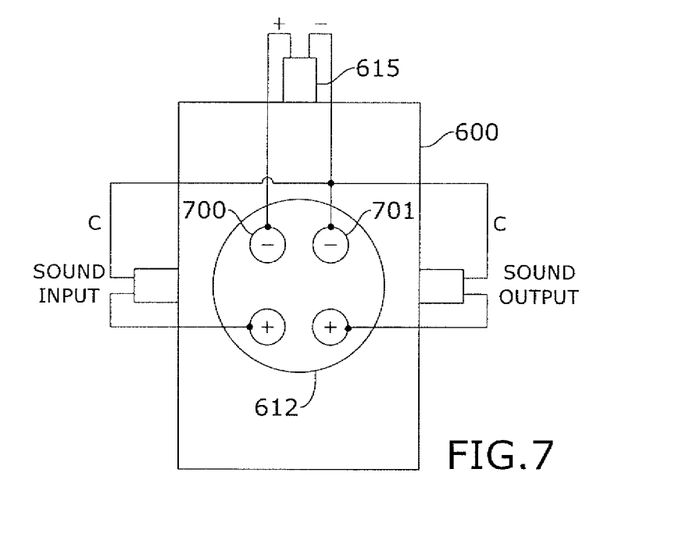
FIG. 7 depicts a schematic bottom view of certain embodiments of the magnetic connector in the effects pedal application.

In one embodiment as depicted in FIG. 7, effects pedal connector 612 is illustrated in more detail with magnetic connection points 700, 701 electrically coupled to power plug 615. In one embodiment, effects pedal connector 612 comprises additional magnetic connection points connected to sound input and sound output wires. It shall be appreciated that the orientation of exposed magnetic poles in the magnetic connection points of the magnetic connector ensures guitar effects pedal 600 can only be connected in one direction/position on pedal board 610. Once connected, guitar effects pedal 600 is secured in place on pedal board 610.

FIG. 8 depicts an alternative embodiment of the magnetic connector in use for a stereo connection. In this embodiment, the magnetic connector comprises any components of the magnetic connector previously described in embodiments of the invention. In one embodiment as depicted in FIG. 8A, first connector 800 comprises magnets 802, 804, 806 connected to input supply 808. Magnet 802 is connected to the left speaker line, magnet 804 is connected to the right speaker line, and magnet 806 is connected to the common line. In one embodiment as depicted in FIG. 8B, second connector 810 comprises magnets 812, 814, 816 connected to output 818 such as an amp speaker. Magnet 812 is connected to the left speaker line, magnet 814 is connected to the right speaker line, and magnet 816 is connected to the common line.

Figure 8A:
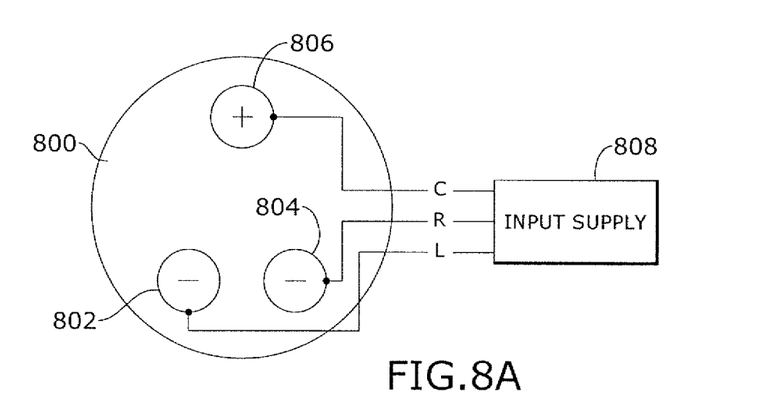
FIG. 8A depicts a schematic view of certain embodiments of the magnetic connector in a stereo audio connection.
Figure 8B:
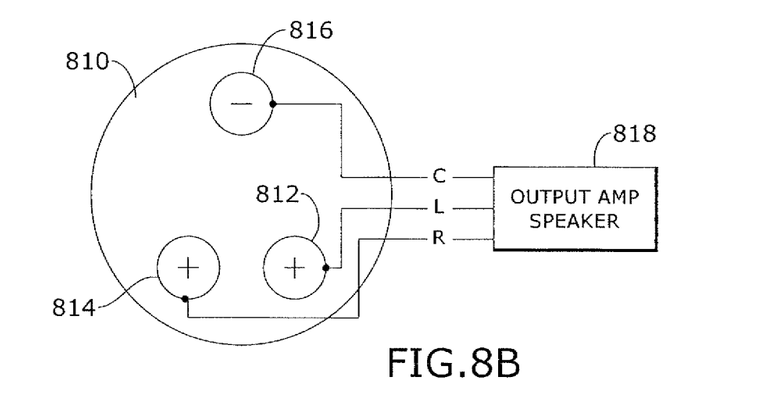
FIG. 8B depicts a schematic view of certain embodiments of the magnetic connector in the stereo audio connection.
Figure 8C:
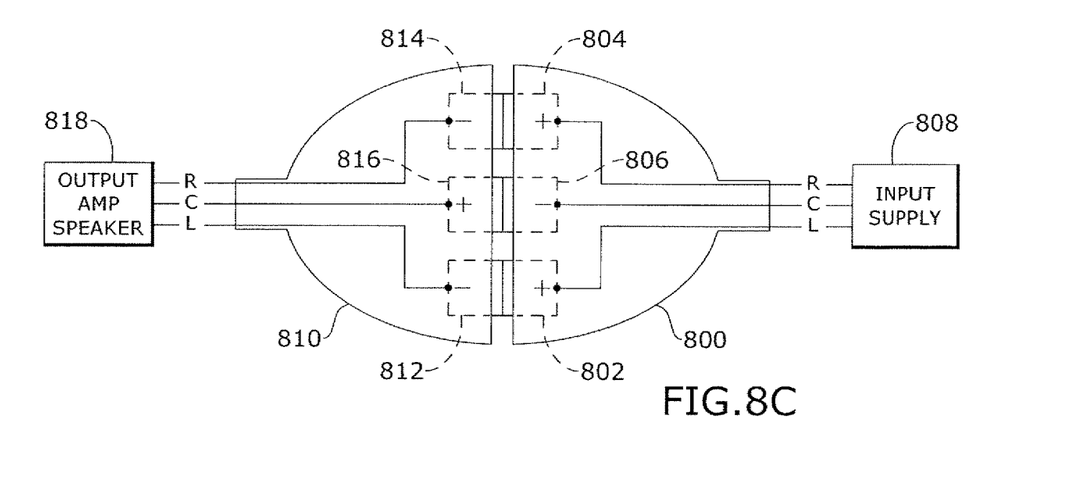
FIG. 8C depicts a schematic view of certain embodiments of the magnetic connector in the stereo audio connection.
Figure 8D:
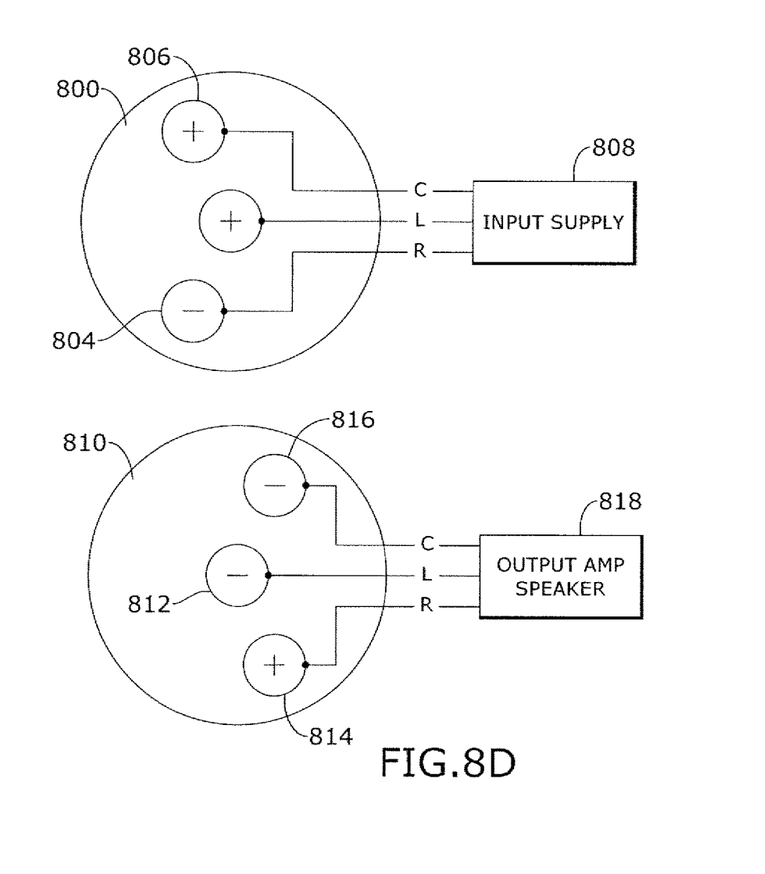
FIG. 8D depicts a schematic view of certain embodiments of the magnetic connector in the stereo audio connection.

In one embodiment as depicted in FIG. 8C, first connector 800 is connected to second connector 810. In this connection, the negative magnetic pole of magnet 804 connects to the positive magnetic pole of magnet 814 to transmit right speaker signals from input supply 808 to output 818. The positive magnetic pole of magnet 806 connects to the negative magnetic pole of magnet 816 to establish the common line. The negative magnetic pole of magnet 802 connects to the positive magnetic pole of magnet 812 to transmit left speaker signals from input supply 808 to output 818. The magnetic footprint of these connectors 800, 810 ensure that they can only be connected in one way. In an alternative embodiment as depicted in FIG. 8D, the orientation of magnets in first and second connectors 800, 810 can vary.

Figure 9:
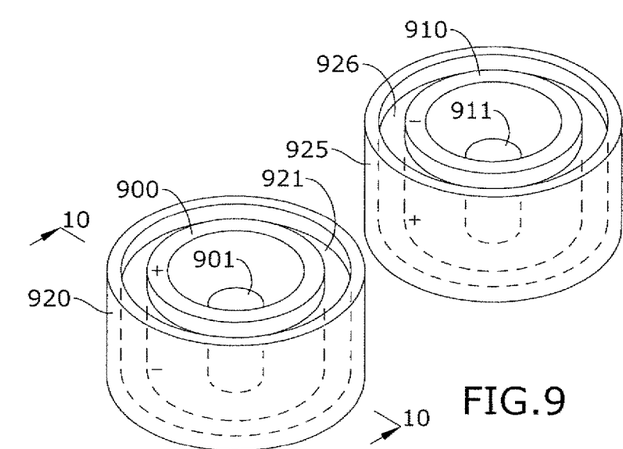
FIG. 9 depicts a perspective view of certain embodiments of the magnetic connector.

In a preferred embodiment as depicted in FIG. 9, each magnet in the magnetic connector described in embodiments of the invention comprises a shield secured around the magnet. In an exemplary embodiment, first magnet 900 comprises central hole 901 and second magnet 910 comprises central hole 911. First and second magnets 900, 910 are preferably rare earth magnets such as neodymium magnets, but can be ceramic magnets. In one embodiment, first shield 920 is coupled to the exterior of first magnet 900 by first epoxy layer 921. Similarly, second shield 925 is coupled to the exterior of second magnet 910 by second epoxy layer 926. The epoxy layer creates a barrier so that the shield does not contact the magnet. It shall be appreciated that alternative adhesives or fastening components can be used to secure each shield to the exterior of a magnet. In one embodiment, first and second shields 920, 925 preferably are made from steel, copper, aluminum or other non-magnetic materials.

Figure 10:
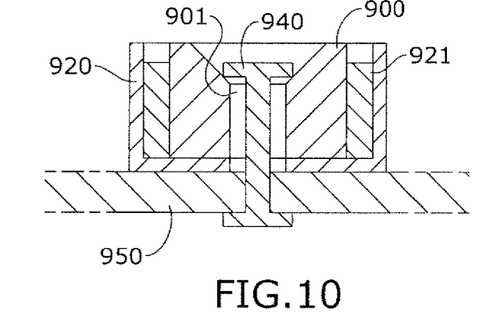
FIG. 10 depicts a section view of certain embodiments of the magnetic connector taken along line 10-10 in FIG. 9 illustrating the attachment of the connector to a plate.

In one embodiment, each central hole 901, 911 in magnets 900, 910 is configured to receive fastener 940 such as a screw, rivet, or other similar type fastener. FIG. 10 illustrates fastener 940 disposed through central hole 901 in first magnet 900. In one embodiment, fastener 940 is also used to secure plate 950 to first magnet 900.

Figure 11:
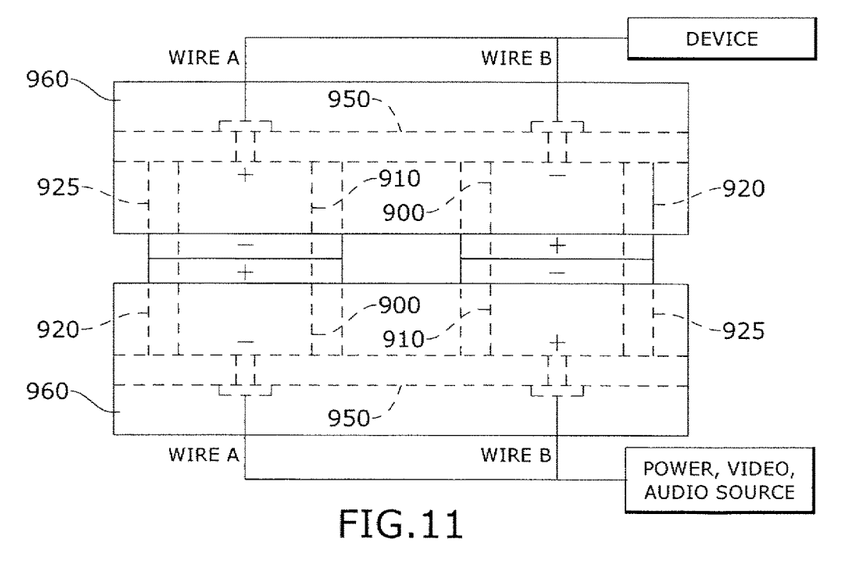
FIG. 11 depicts a schematic view of certain embodiments of the magnetic connector.

In one embodiment as depicted in FIG. 11, the magnetic connector is illustrated with the use of magnets with shields. In this embodiment, each pair of first magnet 900 and second magnet 910 is coupled to connection part 960 by plate 950 and a pair of fasteners 940. Fasteners 940 are coupled to first and second magnets 900, 910 in the same manner depicted in FIG. 10. A pair of connection parts 960 is coupled together as depicted in FIG. 11, with the exposed magnetic poles of first and second magnets 900, 910 of first connection part 960 engaged with opposite exposed magnetic poles of first and second magnets 900, 910 of second connection part 960.

In this connection, the fasteners 940 of each engaged pair of one magnet 900, 910 in the first connection part 960 and one magnet 900, 910 in the second connection part 960 contact each other to transmit the signal (power, video, audio, and the like) from the source to the device via wires A, B. It shall be appreciated that a single fastener 940, pair of fasteners 940, or any alternative number of fasteners can be coupled to the engaged pair of one magnet 900, 910 in the first connection part 960 and one magnet 900, 910 in the second connection part 960 to facilitate the transmission of the desired signal from the source to device. It shall be appreciated that the configuration and connections of magnets, fasteners and shields described herein are preferably used in all embodiments of the magnetic connector described in this application.

The magnetic connectors described in embodiments of the invention have several notable advantages. Each magnetic connector is targeted in that connection parts can only connect together in one possible way. If a user attempts to connect the corresponding pair of connection parts in the wrong way, magnets of the connection parts repel each other, thereby preventing the connection. If a user attempts to connect the corresponding pair of connection parts in the right way, the connection parts engage with each other and are held in place together by the magnets and their magnetic attraction. The magnets and fasteners of the connection parts secure the connection parts together and facilitate the transmission of a plurality of signals from the input supply to the device. The plurality of signals include at least any combination of a left sound signal, a right sound signal, a video signal, a common line signal, positive power and negative power.

Lastly, the shields present around the magnets in the magnetic connector have several advantages. The shield protects the magnet from breaking in the case brittle ceramic magnets are used. Further, the shields surrounding all magnets in the magnetic connector shield magnetic fields from the magnets and the signals being transmitted to prevent interference and crosstalk of any kind.

Further, shields made with materials such as non-magnetic metals including copper, aluminum, brass and others, or plastics, allow each magnet within the shield to more easily center and align with its counterpart (opposite magnetic pole connecting magnet) due to the elimination of any disturbing attraction forces present when the shield is made from steel or another magnetic metal.

It shall be appreciated that the components of the magnetic connectors described in several embodiments herein may comprise any alternative known materials in the field and be of any color, size and/or dimensions. It shall be appreciated that the components of the magnetic connectors described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A magnetic connector for use to transmit a plurality of signals from an input supply to a device, the magnetic connector configured to shield magnetic fields and signals present therein to minimize interference with one another, the magnetic connector comprising:
a pair of connector bodies comprising a first connector body configured to couple to the input supply and a second connector body configured to couple to the device, wherein the first connector body comprises a plurality of first recesses and the second connector body comprises a plurality of second recesses;
a first set of magnets disposed in the plurality of first recesses in the first connector body, the first set of magnets comprising a plurality of first magnets oriented so that a first group of magnets in the first set of magnets comprises exposed positive magnetic poles and a second group of magnets in the first set of magnets comprises exposed negative magnetic poles, each first magnet comprising a first shield disposed around the first magnet;
a second set of magnets disposed in the plurality of second recesses in the second connector body, the second set of magnets comprising a plurality of second magnets oriented so that a third group of magnets in the second set of magnets comprises exposed negative magnetic poles and a fourth group of magnets in the second set of magnets comprises exposed positive magnetic poles, each second magnet comprising a second shield disposed around the second magnet;
wherein the first group of magnets engages with the third group of magnets and the second group of magnets engages with the fourth group of magnets, wherein a fastener is coupled to each of the first and second magnet, the fastener electrically coupled to either the input supply or the device.

2. The magnetic connector of claim 1, wherein each shield in the first and second magnets is made from a material selected from the group consisting of copper, aluminum and other non-magnetic materials.

3. The magnetic connector of claim 2, wherein each shield is coupled to the first magnet or second magnet by an epoxy.

4. The magnetic connector of claim 3, wherein the fastener is a rivet or screw.

5. The magnetic connector of claim 3, wherein the fastener facilitates the transmission of one of the plurality of signals from the input supply to the device, the one of the plurality of signals selected from the group consisting of a left sound signal, a right sound signal, a video signal, a common line signal, positive power and negative power.

6. The magnetic connector of claim 3, wherein a first engaged pair of one magnet in the first group of magnets and one magnet in the third group of magnets facilitates transmission of one of the plurality of signals comprising a left sound signal, wherein a second engaged pair of another magnet in the first group of magnets and another magnet in the third group of magnets facilitates transmission of one of the plurality of signals comprising a right sound signal.

7. The magnetic connector of claim 6, wherein a third engaged pair of one magnet in the second group of magnets and one magnet in the fourth group of magnets facilitates transmission of one of the plurality of signals comprising positive power, wherein a fourth engaged pair of another magnet in the second group of magnets and another magnet in the fourth group of magnets facilitates transmission of one of the plurality of signals comprising negative power.

8. The magnetic connector of claim 7, wherein a fifth engaged pair of a final magnet in the first group of magnets and a final magnet in the third group of magnets facilitates transmission of one of the plurality of signals comprising a video signal.

9. The magnetic connector of claim 8, wherein each connector body in the first and second connector bodies is made from an insulating material.

* * * * *